US012750148B2

(12) United States Patent
Nanjundappa et al.

(10) Patent No.: US 12,750,148 B2
(45) Date of Patent: Sep. 29, 2026

(54) COMMUNICATION SYSTEM WITH ENHANCED USER DATAGRAM PROTOCOL SUPPORT FOR PRECISION TIME PROTOCOL

(71) Applicant: Outdoor Wireless Networks LLC, Richardson, TX (US)

(72) Inventors: Arjun Nanjundappa, Richardson, TX (US); Devaraj Sambandan, Bengaluru (IN); Ehsan Daeipour, Southborough, MA (US); Rahul Agnihotri, Punjab (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 328 days.

(21) Appl. No.: 18/523,422

(22) Filed: Nov. 29, 2023

(65) Prior Publication Data

US 2024/0178928 A1 May 30, 2024

(30) Foreign Application Priority Data

Nov. 30, 2022 (IN) ............................ 202221069032

(51) Int. Cl.
*H04J 3/06* (2006.01)
*H04W 56/00* (2009.01)

(52) U.S. Cl.
CPC .......... *H04J 3/0667* (2013.01); *H04J 3/0697* (2013.01); *H04W 56/0015* (2013.01)

(58) Field of Classification Search
CPC .. H04J 3/0667; H04J 3/0697; H04W 56/0015
See application file for complete search history.

(56) References Cited

U.S. PATENT DOCUMENTS

2023/0163869 A1* 5/2023 Shapira ..................... H04J 3/12
370/503
2025/0184110 A1* 6/2025 Yamamoto .......... H04W 56/001

OTHER PUBLICATIONS

Endrun Technologies, "Precision Time Protocol (PTP/IEEE-1588)", as downloaded on Nov. 3, 2023 from https://endruntechnologies.com/pdf/PTP-1588.pdf, pp. 1 through 6.

* cited by examiner

*Primary Examiner* — Yaotang Wang
(74) *Attorney, Agent, or Firm* — Fogg & Powers LLC

(57) ABSTRACT

A communication system with enhanced user datagram protocol support for precision time protocol (PTP) is provided. The system includes a base station that is configured to provide communication services for user equipment (UE) located within a cell. The base station includes a network service orchestrator (NSO) that is configured to automatically deploy a PTP daemon that includes PTP service instructions. A PTP pod is in communication with the NSO to receive the PTP service instructions. At least one distributed unit (DU) pod is in communication with the PTP pod. The PTP pod is configured to provide timing configuration information to the at least one DU pod.

8 Claims, 5 Drawing Sheets

100

COMMUNICATION SYSTEM WITH ENHANCED USER DATAGRAM PROTOCOL SUPPORT FOR PRECISION TIME PROTOCOL

CROSS-REFERENCE TO RELATED APPLICATIONS

This Application claims priority to Indian Provisional Application Serial No. 202221069032, same title herewith, filed on Nov. 30, 2022, which is incorporated in its entirety herein by reference.

BACKGROUND

Wireless telecommunication systems may use base station entities to interface communications between a client's core network and user equipment (UE), such as but not limited to, cellular phones. A base station may include distributed units (DUs) that are in communication with remote units (RUs) that provide wireless communications with the UE. Communications between the DUs and RUs need to be synchronized to avoid interference which may cause low throughput, poor attach success rate and poor handover success rate.

In wireless telecommunication systems, frequency and time synchronization between DUs and the RUs have been accomplished with an Ethernet connection using synchronized Ethernet and IEEE 1588-2008 precision time protocol (PTP) distributed to the DUs and RUs. Transport of PTP may be directly over L2 Ethernet (ITU-TG.8275.1 full timing on-path support) while transport of PTP over user datagram protocol (UDP)/internet protocol (IP) is required.

The O-RAN Alliance has published various specifications relating to implementing radio access networks in an open and flexible manner. The acronym "O-RAN" is an abbreviation for "Open Radio Access Network." For some of the configurations defined by the O-RAN specifications, the fronthaul used to communicatively couple the DUs and the RUs is a switched Ethernet network. A cloud platform may be used in such O-RAN deployments. A cloud platform refers to an operating system and hardware of a server in an Internet-based data center. It allows the software and hardware to co-exist remotely and at scale. A synchronization plane (S-plane) is a key aspect of O-RAN specifications with requirements defined in working groups for the fronthaul, open interfaces and transport. O-RAN uses topologies such as LLS-C1, LLS-C2, LLS-C3. Frequency and time synchronization in O-RAN LLS-C1, LLS-C2, LLS-C3 topologies are used to avoid interference. A cloud platform time synchronization supports PTP over UDP for the LLS-C1, LLS-C2, and LLS-C3 synchronization topology.

In the LLS-C1 and LLS-C2 topologies, a PTP grand master (GM) clock provides a timing source for all DUs over a mid-haul network. Multiple switches are use in the mid-haul that are PTP aware in order to support full-timing support using G.8275.1. Each DU server has a PTP pod that hosts a slave PTP clock and synchronizes with the mid-haul PTP GM. Each PTP pod provides Linux packages such as ptp4l and phc2sys and provides functionality for DU to PTP synchronization. Every DU that runs on the DU server hosts a master PTP clock. The master clock provides synchronization to all the RUs that are in communication with a DU. The LLS-C1/LLS-C2 solution is preferred for deployments where DUs are part of an open cloud site deployment. The difference between the LLS-C1 and LLS-C2 topologies is a fronthaul PTP switch is used between a DU pod and each RU in the LLS-C2 topology while in the LLS-C1 topology there is a direct point-to-point connection between the DU and each RU with no switches.

In the LLS-C3 topology, a PTP GM clock provides the timing source for all DUs and the RUs over the fronthaul network. Multiple switches are used in the fronthaul, and all the switches are PTP aware in order to support full-timing support using G8275.1. Each DU server has a PTP pod that hosts a slave PTP clock that synchronizes with the PTP GM clock. Each PTP pod provides Linux packages such as ptp4l and phc2sys and provides functionality for DU to PTP synchronization. With the LLS-C3 topology, there may be multiple timing sources available at local data center and a best master clock algorithm may be used to select a clock for synchronization. Hence, for an LLS-C3 topology timing is provided to both the DU and RU from the same source which is typically one or more switches that are present in a fronthaul network.

The PTP functions described above for synchronization occurs in a DU pod. A pod described herein is a group of one or more containers with shared network resources that can be created and managed with Kubernetes. However, there is not an efficient way to provide synchronize between different pods in a cloud platform time synchronization system.

For the reasons stated above and for other reasons stated below which will become apparent to those skilled in the art upon reading and understanding the present specification, there is a need in the art for a cloud platform that provides time synchronization between different pods.

SUMMARY

The following summary is made by way of example and not by way of limitation. It is merely provided to aid the reader in understanding some of the aspects of the subject matter described. Embodiments provides a communication system with enhanced user datagram protocol support for PTP which allows time synchronization between different pods.

In one embodiment, a communication system with enhanced user datagram protocol support for PTP is provided. The communication system includes a base station. The base station is configured to provide communication services for UE located within a cell. The base station includes a NSO, A PTP pod and at least one DU pod. The NSO is configured to automatically deploy a PTP daemon that includes PTP service instructions. The PTP pod is in communication with the NSO to receive the PTP service instructions. The at least one DU pod is in communication with the PTP pod. The PTP pod is configured to provide timing configuration information to the at least one DU pod.

In another embodiment, a method for synchronizing communication components in a communication system with enhanced user datagram protocol support for PTP is provided. The method includes creating at least one node of communication components used to provide communications between a client's core network and UE within a cell, one of the at least one node including a DU pod; deploying a PTP daemon that generates a start PTP service command to start a PTP service; and synchronizing the at least one node based on the start PTP service command.

In still another embodiment, a method for synchronizing communication components in a communication system with enhanced user datagram protocol support for PTP is provided. The method includes creating at least one node of communication components used to provide communications between a client's core network and UE within a cell. One of the at least one node including a DU pod; disabling network time protocol NTP service with a disable kubelet communicated from a NSO to a platform of a select node; starting a PTP service with a start kubelet communicated from the NSO to the platform of the at least one node; and verifying if the at least one node is synchronized.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a synchronized (S)-platform with an integrated precision time protocol (PTP) solution that automatically synchronizes the PTP with DUs of a specific client in different pods. In one example, a network service orchestrator (NSO) provides an automated deployment of PTP daemon with UDP support to a PTP pod. The PTP pod is communicating with each DU pod using a Unix domain socket, in one example, to establish timing synchronization between DU pods. Further, in examples, the NSO of the S-platform provides the PTP information to each DU pod of a client. The NSO adjusts a timing scheduler of each DU pod when needed to adjust the PTP of a DU pod. Having the NSO provide outside PTP directions allows for synchronization across the DU pods so different DU pods may talk to one another.

Figure 1:
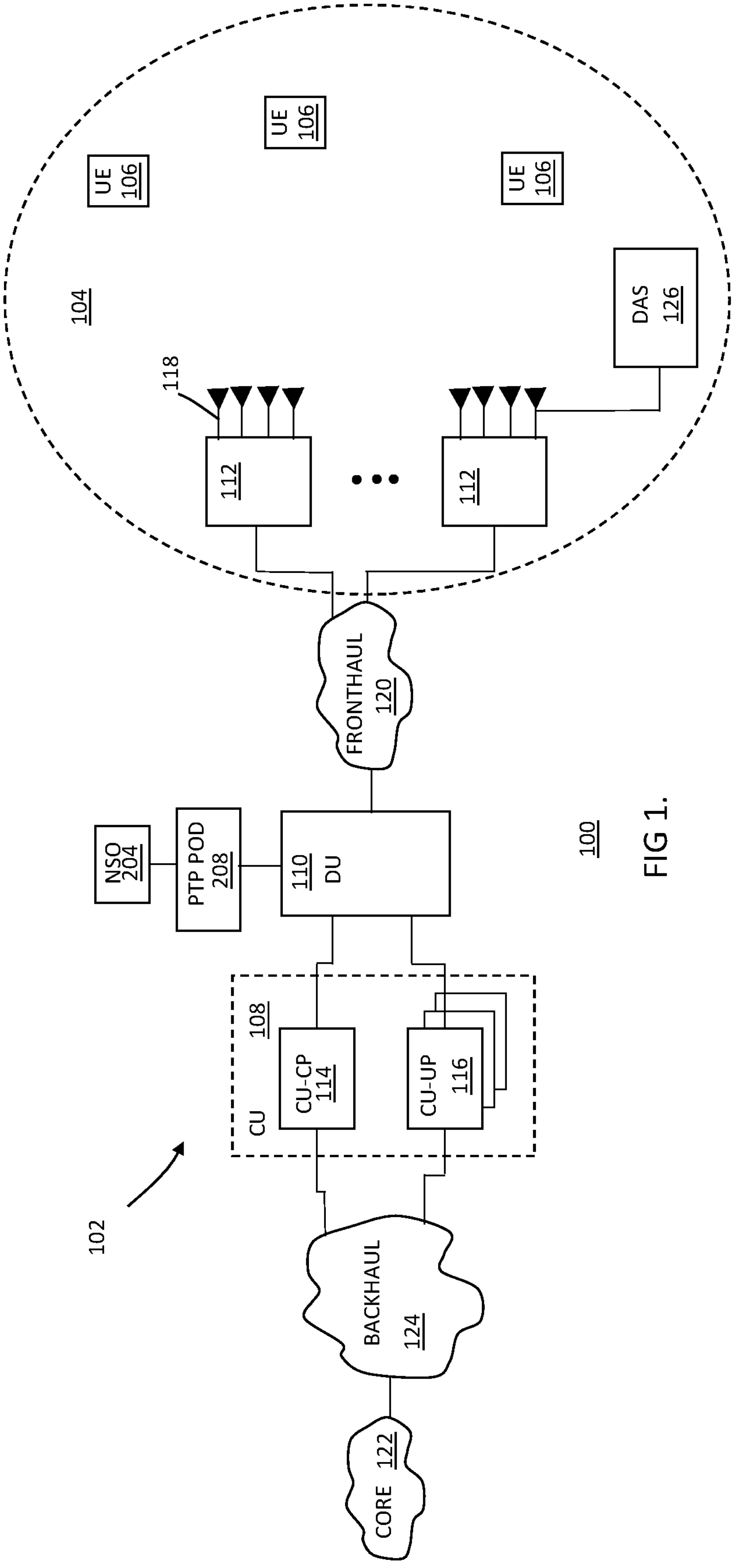
FIG. 1 is a radio access network system according to one example aspect.

FIG. 1 is a block diagram illustrating one exemplary embodiment of a radio access network (RAN) communication system 100 with enhanced user datagram protocol that allows for automatic PTP synchronization of DU pods. The communication system 100 shown in FIG. 1 implements at least one base station entity to serve a cell 104. Each such base station entity can also be referred to here as a "base station 102" or "base station system" (and, which in the context of a fourth generation (4G) Long Term Evolution (LTE) system, may also be referred to as an "evolved NodeB", "eNodeB", or "eNB" and, in the context of a fifth generation (5G) New Radio (NR) system, may also be referred to as a "gNodeB" or "gNB").

In general, each base station 102 is configured to provide wireless communication services to various items of user equipment (UEs) 106 served by the associated cell 104. Unless explicitly stated to the contrary, references to Layer 1, Layer 2, Layer 3, and other or equivalent layers (such as the Physical Layer or the Media Access Control (MAC) Layer) refer to layers of the particular wireless interface (for example, 4G LTE or 5G NR) used for wirelessly communicating with UEs 106. Furthermore, it is also to be understood that 5G NR embodiments can be used in both standalone and non-standalone modes (or other modes developed in the future), and the following description is not intended to be limited to any particular mode. Moreover, although some embodiments are described here as being implemented for use with 5G NR, other embodiments can be implemented for use with other wireless interfaces and the following description is not intended to be limited to any particular wireless interface.

In the specific exemplary embodiment shown in FIG. 1, each base station 102 is implemented as a respective 5G NR gNB (only one of which is shown in FIG. 1 for case of illustration). In this embodiment, each base station 102 is partitioned into one or more central unit entities (CUs) 108, one or more distributed unit entities (DUs) 110, and one or more radio units (RUs) 112. In such a configuration, each CU 108 implements Layer 3 and non-time critical Layer 2 functions for the base station 102. In the embodiment shown in FIG. 1, each CU 108 is further partitioned into one or more control-plane entities 114 and one or more user-plane entities 116 that handle the control-plane and user-plane processing of the CU 108, respectively. Each such control-plane CU entity 114 is also referred to as a "CU-CP" 114, and each such user-plane CU entity 116 is also referred to as a "CU-UP" 116. Also, in such a configuration, each DU 110 is configured to implement the time critical Layer 2 functions and, except as described below, at least some of the Layer 1 functions for the base station 102. In this example, each RU 112 is configured to implement the physical layer functions for the base station 102 that are not implemented in the DU 110 as well as the RF interface. Also, each RU 112 includes a respective set of one or more antenna ports 118 via which the RU 112 can be coupled to a set of antennas (not shown) via which downlink analog RF signals can be radiated to UEs 106 and via which uplink analog RF signals transmitted by UEs 106 can be received.

Each RU 112 is communicatively coupled to the DU 110 serving it via a fronthaul network 120. The fronthaul network 120 can be implemented using a switched Ethernet network, in which case each RU 112 and each physical node on which each DU 110 is implemented includes one or more Ethernet network interfaces to couple each RU 112 and each DU physical node to the fronthaul network 120 in order to facilitate communications between the DU 110 and the RUs 112. In one implementation, the fronthaul interface promulgated by the O-RAN alliance is used for communication between the DU 110 and the RUs 112 over the fronthaul network 120. In another implementation, a proprietary fronthaul interface that uses a so-called "functional split 7-2" for at least some of the physical channels (for example, for the PDSCH and PUSCH) and a different functional split for at last some of the other physical channels (for example, using a functional split 6 for the PRACH and SRS).

In such an example, each CU 108 is configured to communicate with a core network 122 of the associated wireless operator using an appropriate backhaul network 124 (typically, a public wide area network such as the Internet).

Although FIG. 1 (and the description set forth below more generally) is described in the context of a 5G embodiment in which each logical base station entity is partitioned into a CU 108, DUs 110, and RUs 112 and, for at least some of the physical channels, some physical-layer processing is performed in the DUs 110 with the remaining physical-layer processing being performed in the RUs 112, it is to be understood that the techniques described here can be used with other wireless interfaces (for example, 4G LTE) and with other ways of implementing a base station entity (for example, using a conventional baseband band unit (BBU)/remote radio head (RRH) architecture). Accordingly, references to a CU, DU, or RU in this description and associated figures can also be considered to refer more generally to any entity (including, for example, any "base station" or "RAN" entity) implementing any of the functions or features described here as being implemented by a CU, DU, or RU.

Each CU 108, DU 110, and RU 112, and any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 108, DU 110, and RU 112, can be implemented as a physical network function (PNF) (for example, using dedicated physical programmable devices and other circuitry) and/or a virtual network function (VNF) (for example, using one or more general purpose servers (possibly with hardware acceleration) in a scalable cloud environment and in different locations within an operator's network (for example, in the operator's "edge cloud" or "central cloud"). Each VNF can be implemented using hardware virtualization, operating system virtualization (also referred to as containerization), and application virtualization as well as various combinations of two or more the preceding. Where containerization is used to implement a VNF, it may also be referred to as a "containerized network function" (CNF).

For example, in the exemplary embodiment shown in FIG. 1, each RU 112 is implemented as a PNF and is deployed in or near a physical location where radio coverage is to be provided and each virtual CU 108 and DU 110 is implemented using a respective set of one or more VNFs deployed in a distributed manner within one or more clouds (for example, within an "edge" cloud or "central" cloud).

Each CU 108, DU 110, and RU 112, and any of the specific features described here as being implemented thereby, can be implemented in other ways.

In the exemplary embodiment shown in FIG. 1, each base station 102 is coupled to a distributed antenna system (DAS) 126 in order to improve the wireless coverage provided by the base station 102. More specifically, in the exemplary embodiment shown in FIG. 1, an RU 112 of each base station 102 is coupled to the DAS 126 using an analog RF interface. More specifically, the DAS 126 is coupled to the set of antenna ports 118 of the RU 112 that would otherwise be used to couple the RU 112 to a set of antennas. Although the exemplary embodiment shown in FIG. 1 is described as an analog RF interface to couple each base station 102 of the DAS 126, it is to be understood that the base station 102 can be coupled to the DAS 126 in other ways. For example, a digital interface can be used between the DAS 126 and the base station 102 (for example, where a DU 110 of a base station 102 is coupled directly to the DAS 126). Further in an example, a master unit of a DAS 126 may be coupled to the antenna ports 118 of the RUs 112 in one example.

Although in the exemplary embodiment shown in FIG. 1, each base station 102 is coupled to a DAS 126, it is to be understood that the techniques described below can be used with a base station 102 that is not connected to a DAS 126. For example, the techniques described below can also be a base station 102 that is not connected to a DAS 126 but is implemented using a so-called "non-ideal" fronthaul network 120. As used here, a "non-ideal" fronthaul network 120 is one that may not always be able to satisfy the minimum bandwidth and/or latency requirements for the base station that would otherwise be necessary if the techniques described below were not used.

Embodiments provide a PTP synchronization system that employs a network service orchestrator (NSO) and PTP pod. The NSO of the PTP synchronization system 200 provides PTP information to each DU pod of a client.

Figure 2:
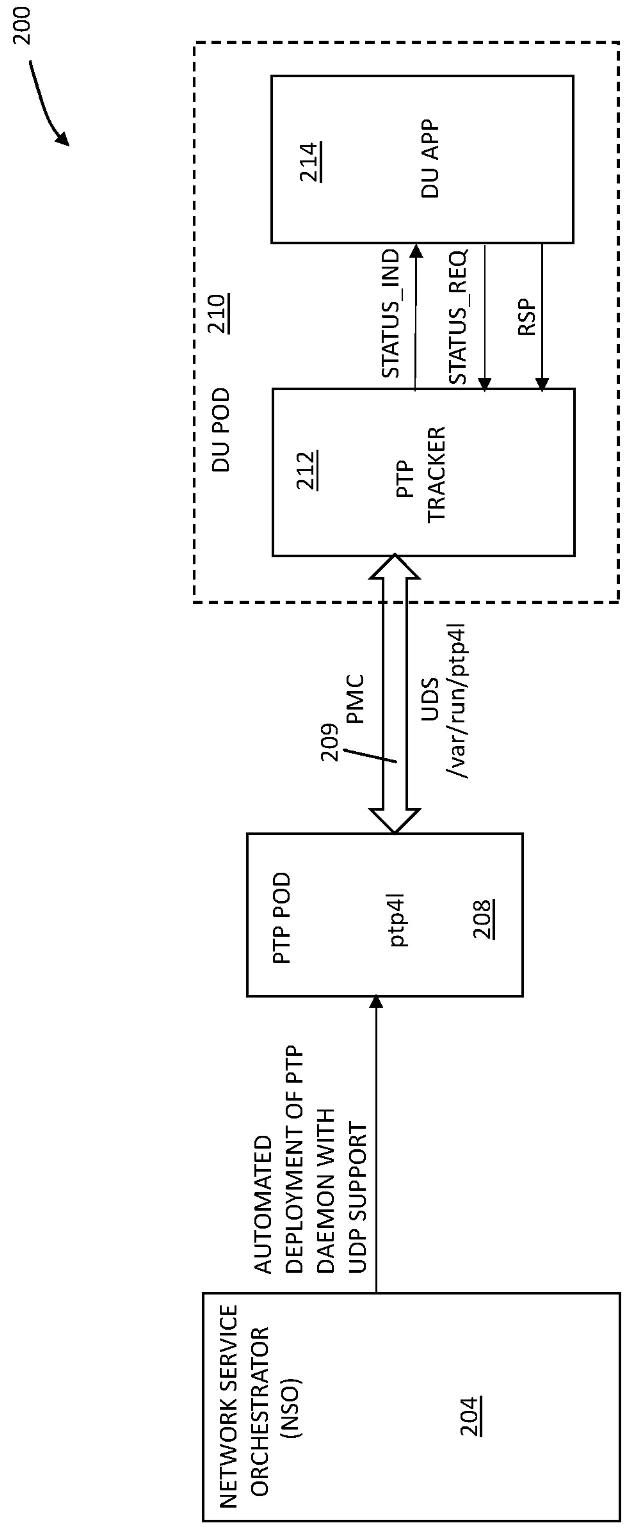
FIG. 2 illustrates a block diagram of a PTP synchronization system according to one example aspect.

FIG. 2 illustrates a PTP synchronization system 200 for PTP over UDP in one example embodiment. The PTP synchronization system 200 includes a NSO 204 that provides an automated deployment of the PTP daemon with UDP support to a PTP pod 208. The PTP pod 208 in turn, is in communication with DU pod 210 through a PTP management client (PMC) interface 209 that communicates PTP information to each DU pod 210 of a client. The PMC interface 209 in one example is a Unix domain socket (UDS)(var/run/ptp4l) over UDP.

The DU pod 210 in this example includes a PTP tracker container 212 that is in communication with the PTP pod 208 via the PMC interface 209. The timing configuration information communicated to the PTP tracker container 212 of the DU pod 210 may include ptp4l roles for the DU pod 210. The ptp4l roles include a slave role that is by default to function as a boundary clock-slave (BC-S). Having the ability to configure into a slave role is mandatory for each DU pod 210 in one example. In another example, a DU pod 210 may also be configured to function as a master. In this example, the PTP pod 208 will configure the DU pod 210 as a boundary clock-master (BC-M). Configuring the DU pod 210 as a BC-M is optional. Further in an example, an IP addresses are automatically assigned to communication components including the PMC interface 209.

Figure 3:
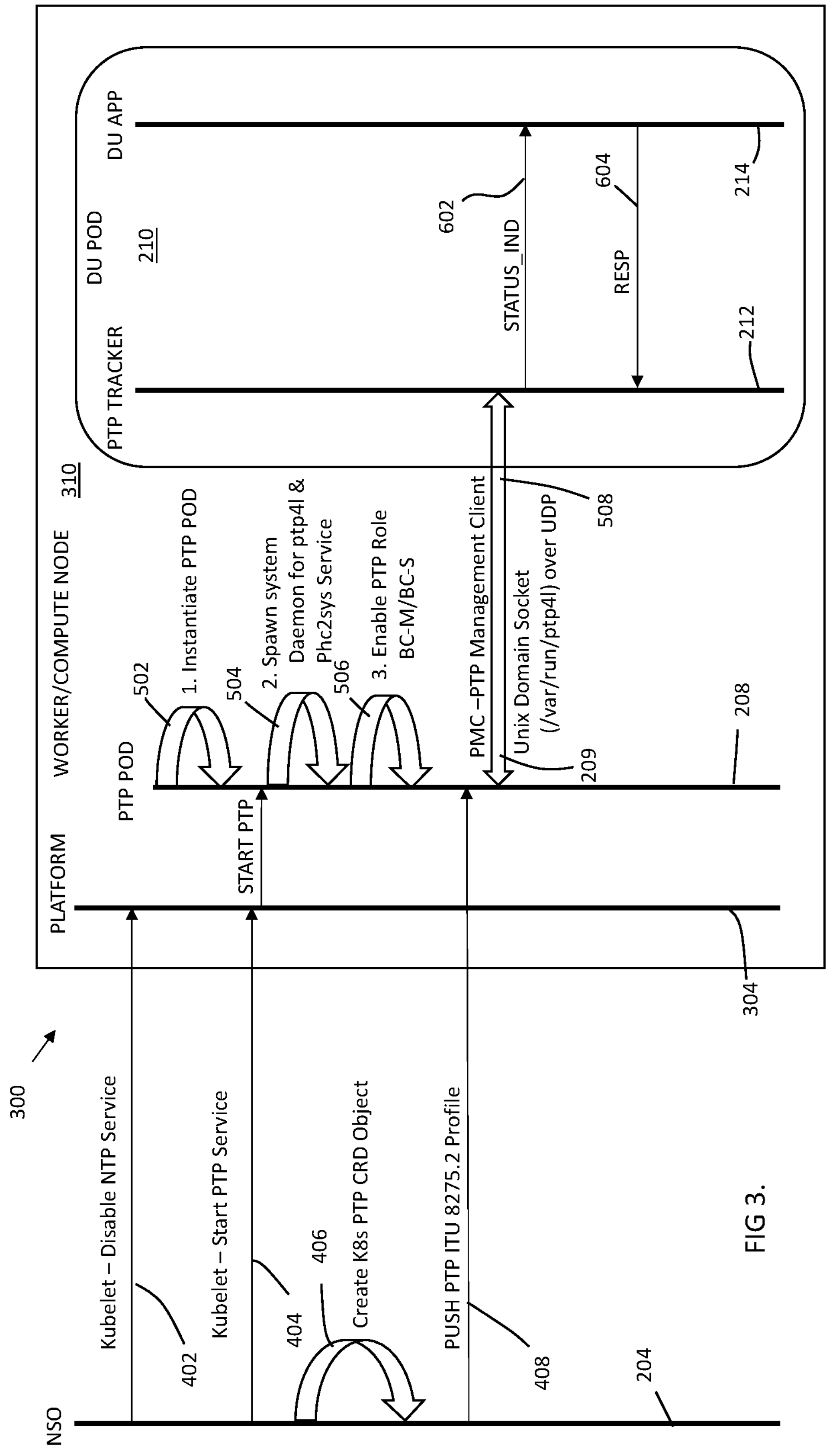
FIG. 3 illustrates a process flow diagram according to one example aspect.

As discussed above, the PTP synchronization system 200 enables PTP service to a desired DU pod 210. Depending on the deployment scenario, a CU and DU pod 210 could be deployed in a same node or in separate nodes. When the PTP synchronization system 200 decides a CU and DU pod 210 is to be run in a single node, the PTP synchronization system 200, in an example, enables PTP service from a control node. In an example, a platform command automates the enabling of PTP service to a desired node. An example node 310 is illustrated in FIG. 3. Moreover, in an example embodiment, the PTP synchronization system 200 may preempt a DU pod 210 from a controller node. In this example, a CU pod may be running in a controller node. The PTP synchronization system 200, in this example, would disables the PTP service on a controller node.

Further in an example, locking/unlocking occurs at the nodes. When the PTP synchronization is lost, the cell 104 needs to be locked until the PTP synchronization is reestablished. The cell 104 goes into a locked state stopping active cell operation (call traffic). When the PTP synchronization is active again, the cell 104 is unlocked which restarts the cell operation (call traffic).

In still another example, once the PTP service is configured, the ptp4l processes are verified if working or not. A S-platform status may be checked to determine the ptp4l processes. The PTP tracker container 212 may also verify contents of /etc/ptp4l.conf. The PTP tracker container 212 may also monitor related logs in /var/log/user.log. If the PTP services are not running, the PTP tracker container 212 updates the /etc/ptp4l.conf, restarts the ptp4l daemon and phc2sys daemon, verifies if ptp4l and phc2sys service is up in the logs, and determines if the clock (GM) is getting selected or not. In one example, the DU pod includes a DU application 214 that is communication with the PTP tracker container 212 that provides a verification response via a status_ind signal to the PTP tracker container 212.

Figure 6:
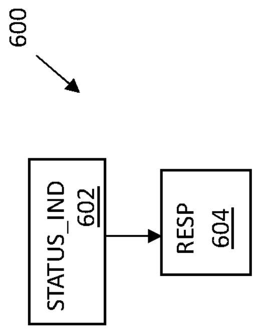
FIG. 6 illustrates a method of operating a DU pod according to one example aspect.
Figure 5:
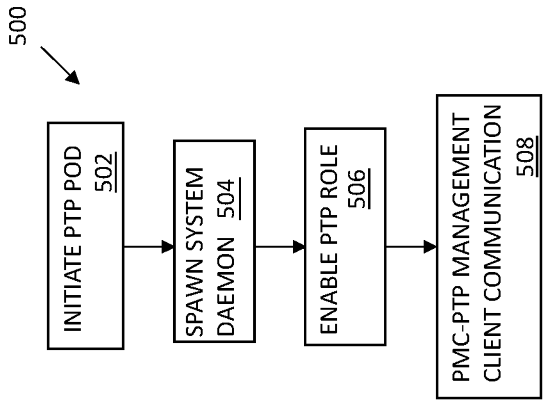
FIG. 5 illustrates a method of operating a PTP pod according to one example.
Figure 4:
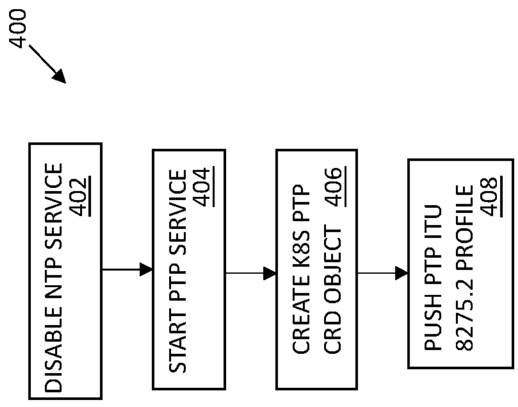
FIG. 4 illustrates a method of operating a network service orchestrator according to one example aspect.

Operation of the PTP synchronization system 200 is described in further detail below in view of the UDP support for PTP synchronization system 200 in the process flow diagram 300 of FIG. 3 further in view of the high-level flow diagrams in FIGS. 4, 5 and 6 illustrating methods 400, 500, and 600 used in the aspects of the UDP support for PTP system discussed in the process flow diagram 300.

The blocks of the methods 400, 500 and 600 provided in the flow diagrams shown in FIGS. 4, 5 and 6 have been arranged in a generally sequential manner for ease of explanation; however, it is to be understood that this arrangement is merely exemplary, and it should be recognized that the processing associated with methods (and the blocks shown in FIGS. 4, 5 and 6) can occur in a different order (for example, where at least some of the processing associated with the blocks is performed in parallel and/or in an event-driven manner). Hence, embodiments are not limited to sequence as set out in FIGS. 4, 5 and 6.

Method 400 of FIG. 4, that is associated with NSO 204, includes disabling a network time protocol (NTP) service with a disable kubelet at block 402. A kubelet is a "node agent" that runs on each node that creates, destroys, or updates pods when instructed to do so. The disable kubelet is communicated from the NSO 204 to a platform 304 of a select worker/compute node 310. The platform 304 in an example is a platform as a service (PaaS) that provides platform services packages in assisting RAN workloads. A start PTP service kubelet is then generated by the NSO and is communicated to the platform 304 at block 404.

The NSO, at block 406, creates a kubelet (K8s) PTP custom resource definition (CRD) object. The NSO pushes a PTP profile of 8275.2 profile of International Telecommunication Union (ITU) standards to the PTP pod 208 at block 408. The PTP profile is IPV6 of unicast mode of communication in an example.

The platform 304 starts the PTP with a communication to the PTP pod 208 as illustrated in FIG. 3. The PTP pod 208, upon receiving the start PTP communication, instantiates the PTP pod 208 to spawn PTP service at block 502. At block 504, the PTP pod starts linuxptp packages which spawns ptp4l and phc2sys services. The ptp4l service acts as a slave PTP as boundary clock slave (BC-S) on a network interface card (NIC) interface and will synchronize with PTP GM. Instance of phc2sys will be running to synchronize the host system clock. In one example, for a PTP pod 208 to behave as PTP master, instance of ptp4l will be running as a master for the fronthaul interface.

At block 506, the PTP pod 208 enables boundary clock master (BC-M) and BC-S services. The PTP pod 208 exposes a PTP management client (PMC) with a PTP-track container 212 of the DU POD 210 at block 508. This involves the PTP pod 208 exposing a Unix domain socket in /var/run for PMC clients to get status, etc. As discussed above, between the PTP pod 208 and the PTP tracker 214 of the DU pod 210, is an interface 209 that provides the PMC which is used for communicating the ptp4l roles for the DU pod 210.

The PTP tracker container 212 of the DU pod 210 provides a new PTP status indication message to the DU application 214 of the DU pod 210 in response to the exposure of the PMC at block 602. The DU application 214 responds with a PTP response message to the PTP tracker container 212 in response to the prior status indication message sent at block 604. The PTP tracker uses the response to verify ptp4l processes.

Figure 7:
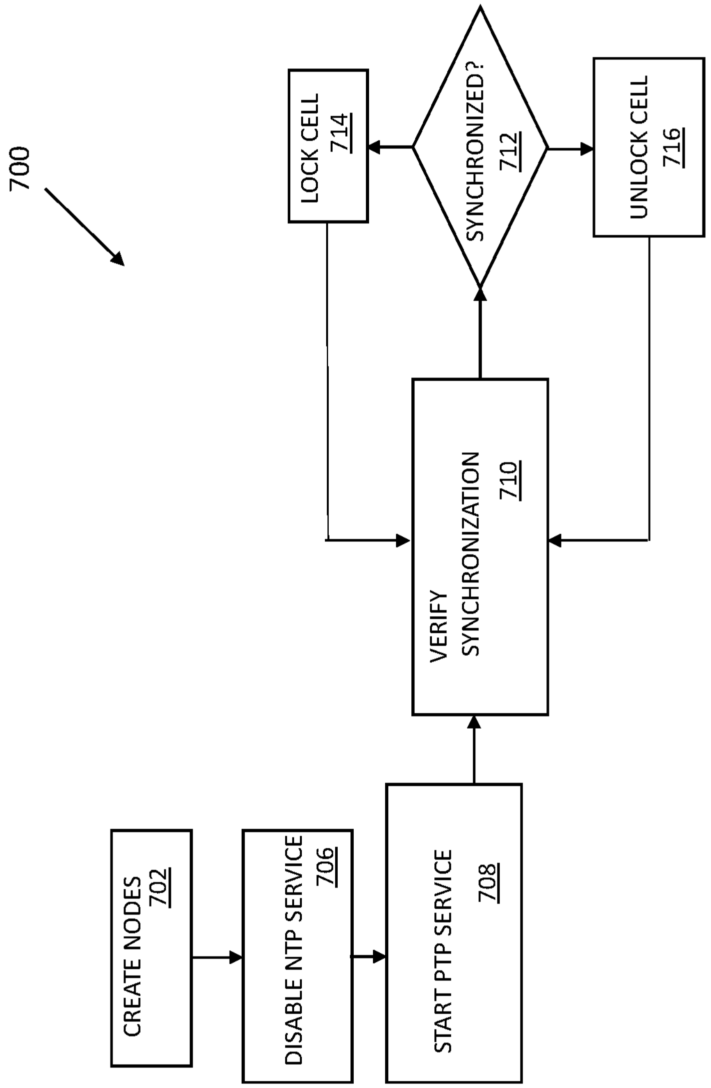
FIG. 7 illustrates a method of operating a PTP synchronization system according to one example aspect.

FIG. 7 illustrates a high-level method 700 for a PTP synchronization system that synchronizes communication components in a communication system with enhanced user datagram protocol support for PTP in view of the embodiments described above. The blocks of the method 700 provided in a flow diagram have been arranged in a generally sequential manner for ease of explanation; however, it is to be understood that this arrangement is merely exemplary, and it should be recognized that the processing associated with methods (and the blocks shown in FIG. 7 can occur in a different order (for example, where at least some of the processing associated with the blocks is performed in parallel and/or in an event-driven manner). Hence, embodiments are not limited to sequence as set out in FIG. 7.

At block 702, nodes are created in communication components used for a client. For example, a node 310 may include a platform 304, a PTP pod 208 and DU pod 210 as illustrated in FIG. 3. A node may include a CU and DU used for client in another example. One of the nodes may be designated as a control node that is used to synchronize the other nodes used for communications of a client. In one example, the NSO 204 creates the nodes.

At bock 706, NTP service is disabled and the start of the PTP service occurs at block 708. The PTP service is run in the background that enables the synchronizing communication components in the communication system with enhanced user datagram protocol support for PTP.

It is then verified if the nodes are time synchronized by the PTP service at block 710. If it is determined a block 712 the nodes are synchronized, the cell 104 is in an unlocked state at block 716 and the process continues verifying synchronization at block 710. If it is determined that synchronization is lost in one of nodes covering the cell 104, the cell 104 is locked at block 714 and communications between UEs 106 and the base station 102 is stopped. The process continues verifying if synchronization is present at block 710. Once synchronization is determined to be present again, the cell is unlocked at block 716 and communications are allowed to resume between the base station 102 and the UEs 106.

EXAMPLE EMBODIMENTS

Example 1 is a communication system with enhanced user datagram protocol support for PTP. The communication system includes a base station. The base station is configured to provide communication services for UE located within a cell. The base station includes a NSO, A PTP pod and at least one DU pod. The NSO is configured to automatically deploy a PTP daemon that includes PTP service instructions. The PTP pod is in communication with the NSO to receive the PTP service instructions. The at least one DU pod is in communication with the PTP pod. The PTP pod is configured to provide timing configuration information to the at least one DU pod.

Example 2 includes the communication system of Example 1, further including a platform that is in communication with the NSO to receive disable network time protocol NTP service and start PTP service signals from the NSO. The platform is configured to automatically enable PTP service in a desired node that includes the at least one DU pod.

Example 3 includes the communication system of Example 2, wherein the platform is a PaaS that provides platform services packages in assisting RAN workloads.

Example 4 includes the communication system of any of the Examples, 1-3, further including a PMC interface used to provide communications between the PTP POD and the at least one DU pod.

Example 5 includes the communication system of Example 4, wherein the PMC interface is a Unix domain socket.

Example 6 includes the communication system of any of the Examples 1-5, wherein the at least one DU pod further includes a PTP tracker container and a DU application. The PTP tracker configured to track synchronization the DU pod. The DU application that is in communication with the PTP tracker to provide a response synchronization verification to the PTP tracker container.

Example 7 includes the communication system of any of the Examples 1-6, further including a plurality of nodes serving a client. At least one of the plurality of nodes including the PTP pod and the at least one DU pod.

Example 8 includes the communication system of Example 7, wherein one of the plurality of nodes is control node with a boundary clock master.

Example 9 includes the communication system of Example 7, wherein each node of the plurality of nodes selectively enables a PTP boundary clock slave role.

Example 10 includes a method for synchronizing communication components in a communication system with enhanced user datagram protocol support for PTP. The method includes creating at least one node of communication components used to provide communications between a client's core network and UE within a cell, one of the at least one node including a DU pod; deploying a PTP daemon that generates a start PTP service command to start a PTP service; and synchronizing the at least one node based on the start PTP service command.

Example 11 includes the method of Example 10, further including verifying if the at least one node is synchronized; locking the cell when the at least one node is not synchronized stopping communications with the UE; and unlocking the cell when the at least one node is synchronized allowing communications with the UE.

Example 12 includes the method of any of the Examples 10-11, further including NTP service with a disable kubelet communicated from a NSO to a platform of the at least one node.

Example 13 includes the method of any of the Examples 10-12, wherein starting the PTP service uses a start kubelet communicated from a NSO to a platform of the at least one node.

Example 14 includes the method of any of the Examples 10-15, further including enabling a boundary clock slave role for each of the at least one node.

Example 15 includes the method of any of the Examples 10-16, further including creating a control node from a node of the at least one node, enabling the PTP service from the control node.

Example 16 includes the method of Example 15, further including enabling a boundary clock master role for the control node.

Example 17 includes a method for synchronizing communication components in a communication system with enhanced user datagram protocol support for PTP. The method includes creating at least one node of communication components used to provide communications between a client's core network and UE within a cell. One of the at least one node including a DU pod; disabling network time protocol NTP service with a disable kubelet communicated from a NSO to a platform of a select node; starting a PTP service with a start kubelet communicated from the NSO to the platform of the at least one node; and verifying if the at least one node is synchronized.

Example 18 includes the method of Example 17, further including locking the cell when the at least one node is not synchronized stopping communications with the UE; and unlocking the cell when the at least one node is synchronized allowing communications with the UE.

Example 19 includes the method of any of the Examples 17-18, further including enabling a boundary clock slave role for each of the at least one node.

Example 20 includes the method of any of the Examples 17-19, further including creating a control node from a node of the at least one node; and enabling the PTP service from the control node.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A communication system with enhanced user datagram protocol support for precision time protocol (PTP), the communication system comprising:

a base station configured to provide communication services for user equipment (UE) located within a cell, the base station including, a network service orchestrator (NSO) configured to automatically deploy a PTP daemon that includes PTP service instructions;

a PTP pod in communication with the NSO to receive the PTP service instructions;

at least one distributed unit (DU) pod in communication with the PTP pod, the PTP pod configured to provide timing configuration information to the at least one DU pod; and a platform in communication with the NSO to receive disable network time protocol NTP service and start PTP service signals from the NSO, the platform configured to automatically enable PTP service in a desired node that includes the at least one DU pod.

2. The communication system of claim 1, wherein the platform is a platform as a service (PaaS) that provides platform services packages in assisting radio access network (RAN) workloads.

3. The communication system of claim 1, further comprising:

a PTP management client (PMC) interface used to provide communications between the PTP POD and the at least one DU pod.

4. The communication system of claim 3, wherein the PMC interface is a Unix domain socket.

5. A communication system with enhanced user datagram protocol support for precision time protocol (PTP), the communication system comprising:

a base station configured to provide communication services for user equipment (UE) located within a cell, the base station including, a network service orchestrator (NSO) configured to automatically deploy a PTP daemon that includes PTP service instructions;

a PTP pod in communication with the NSO to receive the PTP service instructions; and at least one distributed unit (DU) pod in communication with the PTP pod, the PTP pod configured to provide timing configuration information to the at least one DU pod, wherein the at least one DU pod further includes, a PTP tracker container configured to track synchronization the DU pod; and a DU application that is in communication with the PTP tracker to provide a response synchronization verification to the PTP tracker container.

6. The communication system of claim 1, further comprising:

a plurality of nodes serving a client, at least one of the plurality of nodes including the PTP pod and the at least one DU pod.

7. The communication system of claim 6, wherein one of the plurality of nodes is control node with a boundary clock master.

8. The communication system of claim 6, wherein each node of the plurality of nodes selectively enables a PTP boundary clock slave role.

* * * * *